United States Patent
Yao

(10) Patent No.: US 7,598,319 B2
(45) Date of Patent: Oct. 6, 2009

(54) RESIN COMPOSITION, RESIN MOLDING PRODUCT, PRODUCTION METHOD OF RESIN MOLDING PRODUCT AND RECYCLING METHOD OF RESIN MOLDING PRODUCT

(75) Inventor: Kenji Yao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 295 days.

(21) Appl. No.: 11/714,847

(22) Filed: Mar. 7, 2007

(65) Prior Publication Data

US 2008/0051507 A1      Feb. 28, 2008

(30) Foreign Application Priority Data

Aug. 23, 2006    (JP)    ............................. 2006-226957

(51) Int. Cl.
*C08L 97/00* (2006.01)
(52) U.S. Cl. ...................................... 525/54.21; 524/74
(58) Field of Classification Search ................... 524/74; 525/54.21
See application file for complete search history.

(56) References Cited

U.S. PATENT DOCUMENTS

2008/0051507 A1 * 2/2008 Yao ............................ 524/599

FOREIGN PATENT DOCUMENTS

JP       A 2005-048066      2/2005

* cited by examiner

Primary Examiner—Peter Szekely
(74) Attorney, Agent, or Firm—Oliff & Berridge, PLC

(57) ABSTRACT

A resin composition is provided and includes a copolymer having a structure represented by formula (I) and a structure represented by formula (II).

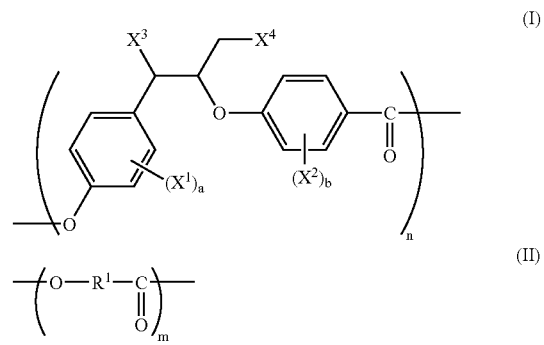

In the formulae, $X^1$ and $X^2$ each independently represent a hydrogen atom, a hydroxyl group, a substituted or unsubstituted alkyl group, a substituted or unsubstituted aryl group, or a substituted or unsubstituted alkoxy group; $X^3$ and $X^4$ each independently represent a hydroxyl group, a substituted or unsubstituted alkyl group, a substituted or unsubstituted aryl group, a substituted or unsubstituted alkoxy group, or a substituted or unsubstituted alkoxycarbonyl group; a and b each independently are an integer of from 1 to 4, and n is an integer of from 1 to 10, and $R^1$ represents a linear or branched alkylene group; and m is an integer of 10 or more.

30 Claims, 1 Drawing Sheet

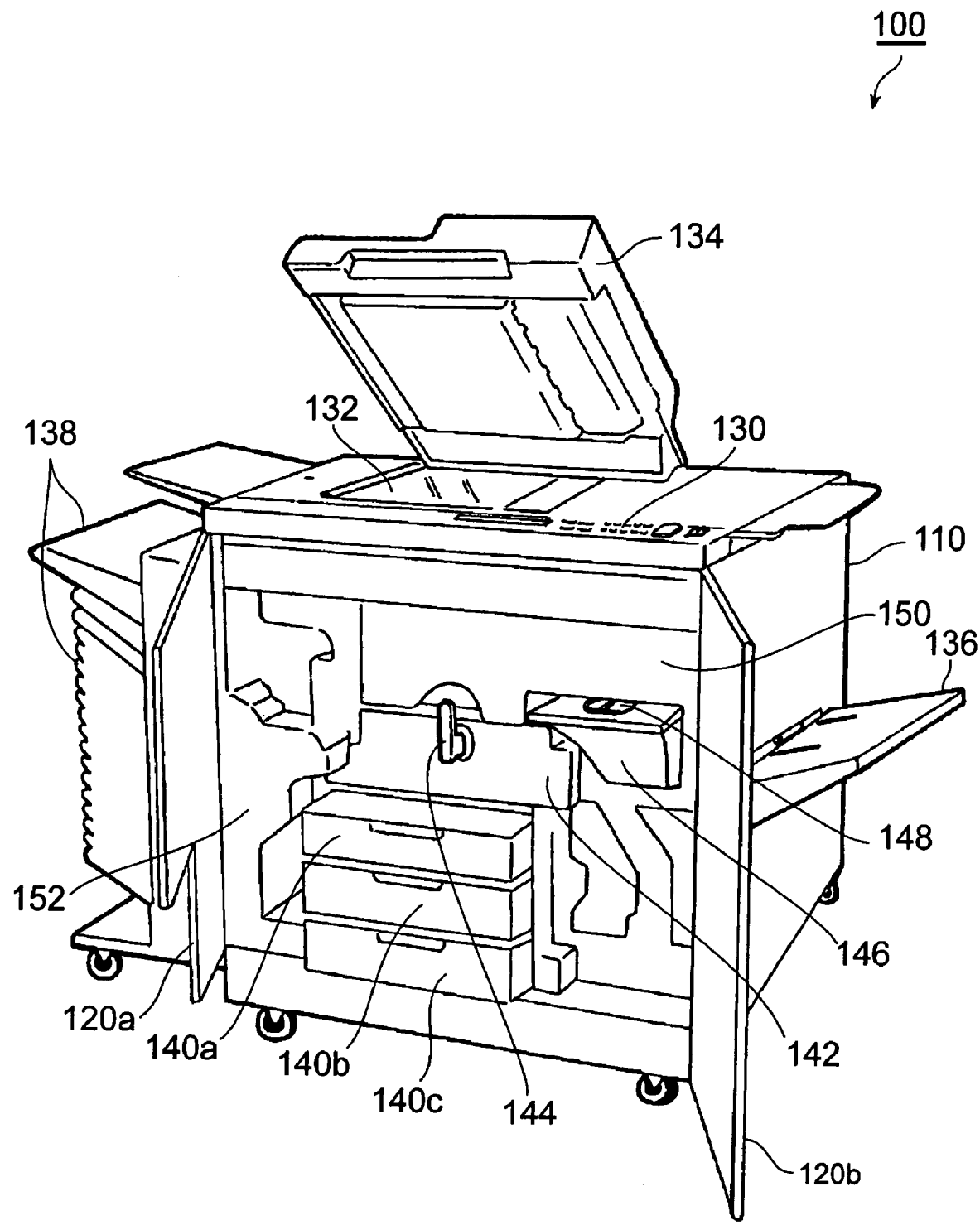

RESIN COMPOSITION, RESIN MOLDING PRODUCT, PRODUCTION METHOD OF RESIN MOLDING PRODUCT AND RECYCLING METHOD OF RESIN MOLDING PRODUCT

CROSS-REFERENCE TO RELATED APPLICATION

This application is based on and claims priority under 35 USC §119 from Japanese Patent Application No. 2006-226957 filed Aug. 23, 2006.

BACKGROUND (i) Technical Field

The present invention relates to a resin composition, a resin molding product, and a method of producing the resin molding product.

(ii) Background Art

Recently, from efforts to environmental issues represented by global warming, exhaustion of petroleum and waste issue, and concept of establishment of sustained circulating society, development of a biomass material derived from plants is increasingly made.

In the fields of home electrical appliances, business equipments and the like, the proportion of a resin molding product is increasing in a member constitution of products. From this fact, it is particularly expected to utilize a biomass material as a material for a resin molding product. As the biomass material used in a resin material, for example, aliphatic polyester such as a polylactic acid that can be produced from grains or the like without using petroleum at all is watched. However, for example, a polylactic acid is hard and brittle, and has poor heat resistance. Therefore, its application is limited to agricultural sheets, household garbage bags and the like. Where the polylactic acid is directly used as a member having high demand characteristics, such as home electrical appliances and business equipments, such a member is easy to be broken or deformed.

As methods of improving the above issues, the technique of blending a polylactic acid and a petroleum resin is known.

However, the resin composition including the blend of a polylactic acid and a polycarbonate has the following issues, and is not always said to be sufficient. Specifically, a resin molding product formed from the resin composition is not sufficient in impact strength and heat resistance, and thus was not sufficiently satisfied with the properties required in packages or parts of home electric appliances and business equipments. To improve impact strength and heat resistance in the above resin, a method of increasing the content of a polycarbonate, or further blending other petroleum resin is considered. However, in such a method, a biobased content of the resin molding product is too small, and the object of a biomass material itself cannot sufficiently be achieved.

SUMMARY

According to one aspect of the invention, there is provided a resin composition comprising a copolymer having a structure represented by formula (I) and a structure represented by formula (II):

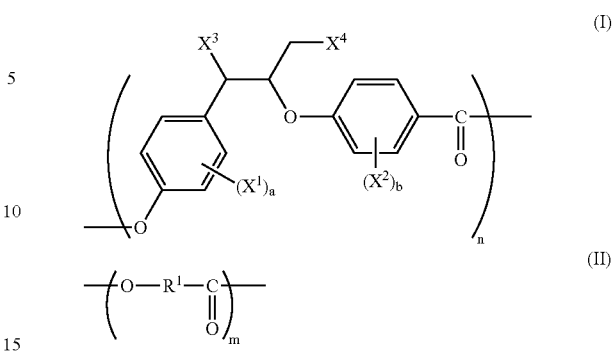

wherein $X^1$ and $X^2$ each independently represent a hydrogen atom, a hydroxyl group, a substituted or unsubstituted alkyl group, a substituted or unsubstituted aryl group, or a substituted or unsubstituted alkoxy group; $X^3$ and $X^4$ each independently represent a hydroxyl group, a substituted or unsubstituted alkyl group, a substituted or unsubstituted aryl group, a substituted or unsubstituted alkoxy group, or a substituted or unsubstituted alkoxycarbonyl group; a and b each independently are an integer of from 1 to 4, and n is an integer of from 1 to 10, and wherein $R^1$ represents a linear or branched alkylene group; and m is an integer of 10 or more.

BRIEF DESCRIPTION OF THE DRAWING

Embodiments of the present invention will be described in detail based on the following FIGURE, wherein:

The sole FIGURE is a perspective view of an image forming apparatus provided with packages and business equipment parts, according to one exemplary embodiment of a resin molding of the invention.

DETAILED DESCRIPTION

Exemplary embodiments of the invention are described in detail below by referring to the FIGURE. In the description of the FIGURE, the same numerical reference is assigned to the same or corresponding element, the overlapped description is omitted.

<Resin Composition>

A resin composition of a first exemplary embodiment of the invention (hereinafter, sometimes referred to as "the first resin composition") includes a copolymer having a structure represented by formula (I) and a structure represented by formula (II):

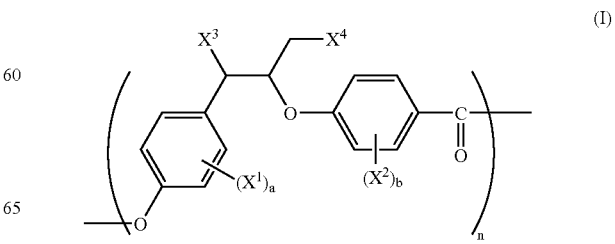

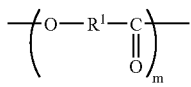
(II)

wherein $X^1$ and $X^2$ each independently represent a hydrogen atom, a hydroxyl group, a substituted or unsubstituted alkyl group, a substituted or unsubstituted aryl group, or a substituted or unsubstituted alkoxy group; $X^3$ and $X^4$ each independently represent a hydroxyl group, a substituted or unsubstituted alkyl group, a substituted or unsubstituted aryl group, a substituted or unsubstituted alkoxy group, or a substituted or unsubstituted alkoxycarbonyl group; a and b each independently are an integer of from 1 to 4, and n is an integer of from 1 to 10, and wherein $R^1$ represents a linear or branched alkylene group; and m is an integer of 10 or more.

As alkyl groups, those having 1 to 20 carbon atoms are preferable, those having 1 to 10 carbon atoms are more preferable, and those having 1 to 5 carbon atoms are still more preferable. As aryl groups, those having 1 to 20 carbon atoms are preferable, those having 1 to 10 carbon atoms are more preferable, and those having 1 to 5 carbon atoms are still more preferable. As alkoxy groups, those having 1 to 20 carbon atoms are preferable, those having 1 to 10 carbon atoms are more preferable, and those having 1 to 5 carbon atoms are still more preferable. As alkoxycarbonyl groups, those having 1 to 20 carbon atoms are preferable, and those having 1 to 10 carbon atoms are more preferable. As alkylene groups, those having 1 to 20 carbon atoms are preferable, those having 1 to 10 carbon atoms are more preferable, and those having 1 to 5 carbon atoms are still more preferable.

Specific examples of the structure represented by formula (I) include structures represented by formulae (N-1) to (N-14).

| Number | Structural Formula |
|---|---|
| N-1 | 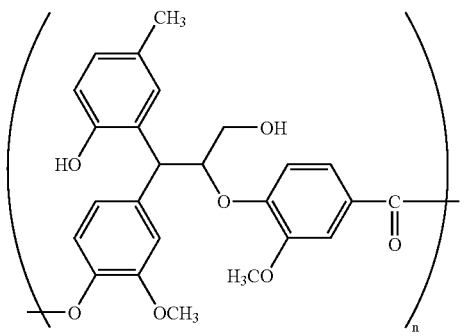 |
| N-2 | 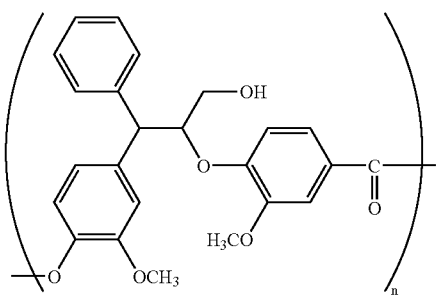 |
| N-3 | 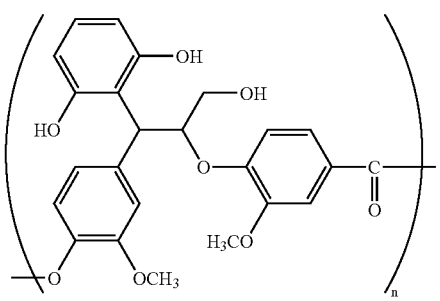 |
| N-4 | 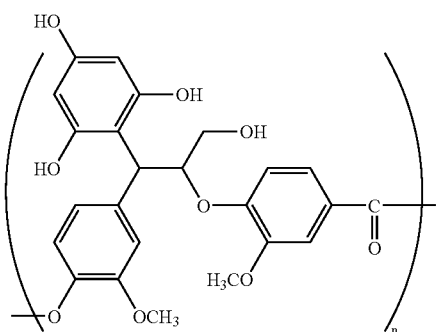 |
| N-5 | 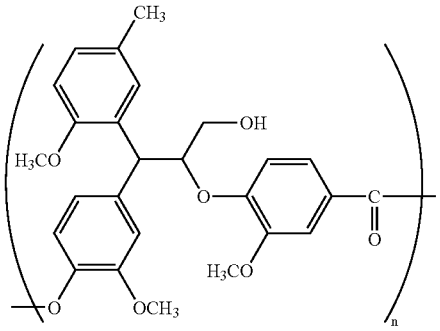 |

| Number | Structural Formula |
|---|---|
| N-6 | 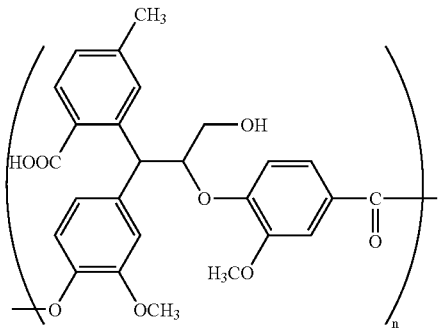 |
| N-7 | 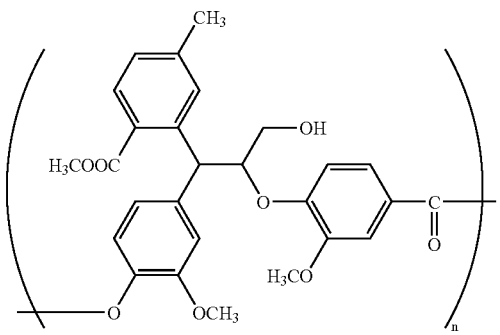 |
| N-8 | 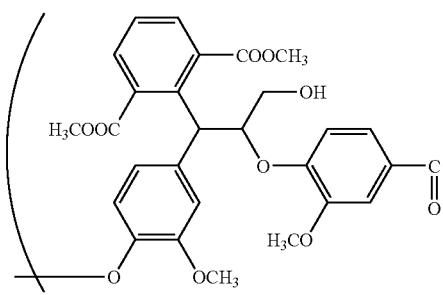 |
| N-9 | 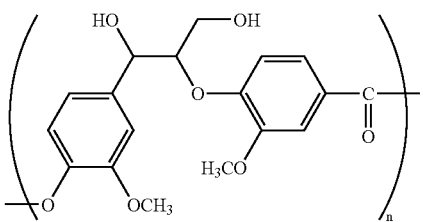 |
| N-10 | 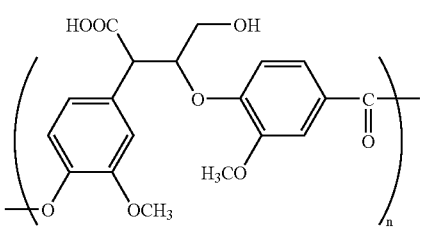 |
| Number | Structural Formula |
|---|---|
| N-11 | 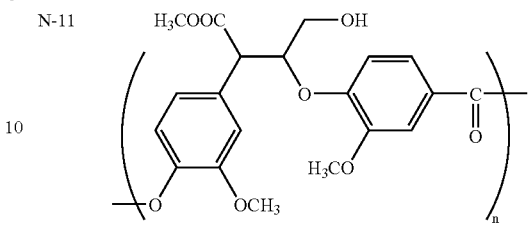 |
| N-12 | 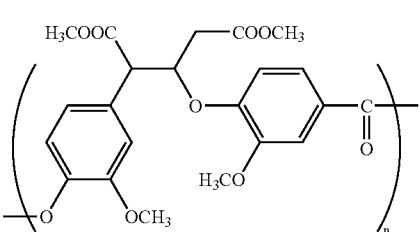 |
| N-13 | 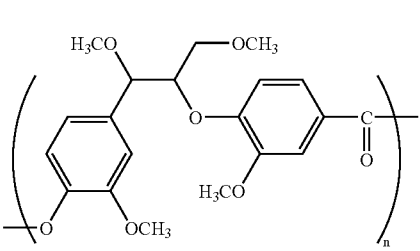 |
| N-14 | 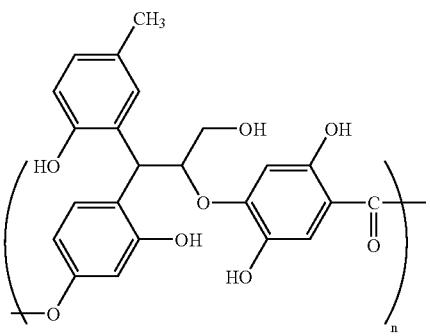 |
Specific examples of the structure represented by formula (II) include structures represented by formulae (M-1) to (M-10).
| Number | Structural Formula |
|---|---|
| M-1 | 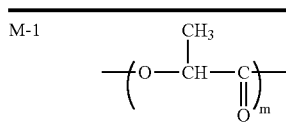 |
| M-2 | 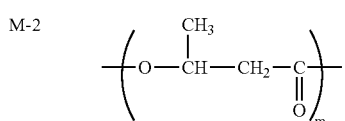 |

-continued

| Number | Structural Formula |
|---|---|
| M-3 | $-\!\!\left(\!O\!-\!CH_2\!-\!CH_2\!-\!\underset{\underset{O}{\|}}{C}\!\right)_{\!\!m}\!\!-$ |
| M-4 | $-\!\!\left(\!O\!-\!CH_2\!-\!CH_2\!-\!CH_2\!-\!CH_2\!-\!\underset{\underset{O}{\|}}{C}\!\right)_{\!\!m}\!\!-$ |
| M-5 | $-\!\!\left(\!O\!-\!\underset{\underset{}{CH_3}}{\overset{}{CH}}\!-\!CH_2\!-\!CH_2\!-\!CH_2\!-\!\underset{\underset{O}{\|}}{C}\!\right)_{\!\!m}\!\!-$ |
| M-6 | $-\!\!\left(\!O\!-\!CH_2\!-\!CH_2\!-\!CH_2\!-\!CH_2\!-\!CH_2\!-\!CH_2\!-\!\underset{\underset{O}{\|}}{C}\!\right)_{\!\!m}\!\!-$ |
| M-7 | $-\!\!\left(\!O\!-\!\underset{\underset{}{CH_3}}{\overset{}{CH}}\!-\!CH_2\!-\!CH_2\!-\!CH_2\!-\!CH_2\!-\!CH_2\!-\!\underset{\underset{O}{\|}}{C}\!\right)_{\!\!m}\!\!-$ |
| M-8 | $-\!\!\left(\!O\!-\!\underset{\underset{}{\underset{CH_2}{\overset{CH_3}{\|}}}}{\overset{}{CH}}\!-\!CH_2\!-\!\underset{\underset{O}{\|}}{C}\!\right)_{\!\!m}\!\!-$ |
| M-9 | $-\!\!\left(\!O\!-\!\underset{\underset{}{\underset{CH_2}{\overset{\overset{H_3C\ CH_3}{CH}}{\|}}}}{\overset{}{CH}}\!-\!CH_2\!-\!\underset{\underset{O}{\|}}{C}\!\right)_{\!\!m}\!\!-$ |
| M-10 | $-\!\!\left(\!O\!-\!\underset{\underset{}{\underset{CH_3}{\|}}}{\overset{\overset{\overset{CH_3}{\|}}{CH_2}}{C}}\!-\!CH_2\!-\!\underset{\underset{O}{\|}}{C}\!\right)_{\!\!m}\!\!-$ |

In the copolymer contained in the first resin composition, from the standpoint of improving fluidity at low temperature, n in formula (I) may be from 1 to 5. Further, from the standpoint of improving low temperature fluidity and mechanical strength of a molding, m in formula (II) may be from 10 to 1,000,000, and preferably may be from 10 to 10,000.

The first resin composition may contain a copolymer in which n in formula (I) and m in formula (II) are satisfied with formula (A):

$$10{,}000 \geq (m/n) \geq 10 \quad (A)$$

Where (m/n) is less than 10, low temperature moldability of the resin composition may be difficult to develop. On the other hand, where the (m/n) exceeds 10,000, low temperature moldability of the resin composition may be also difficult to develop. When the resin composition contains the copolymer satisfying the above formula (A), it is possible to produce the resin molding having excellent impact strength and heat resistance further surely. Further, the recycling efficiency of the resin molding can further be improved.

In the first resin composition, the copolymer may contain the structure represented by the above-described (M-1) derived from a polylactic acid as the structure represented by formula (II). In this case, particularly excellent low temperature fluidity can be obtained.

The copolymer may have a weight average molecular weight of from 10,000 to 500,000, and preferably from 20,000 to 200,000 in terms of polystyrene. Where the weight average molecular weight is less than 10,000, the resin molding formed may have the tendency that impact strength becomes too low. On the other hand, where the weight average molecular weight exceeds 500,000, fluidity of the resin composition may decrease, and as a result, there may be the tendency that it is difficult to produce a resin molding having a complicated shape by room temperature molding.

The copolymer can be used alone or as mixtures of two or more thereof.

In the first resin composition, the content of the copolymer may be 50 weight % or more, and preferably 70 weight % or more, based on the entire weight of the resin composition. Where the content of the copolymer is less than 50 weight %, low temperature moldability of the resin composition may be difficult to develop.

A resin composition of a second exemplary embodiment of the invention (hereinafter, sometimes referred to as "the second resin composition") includes a copolymer obtained by reacting a lignophenol compound represented by the formula (III) with an aliphatic polyester compound represented by formula (IV):

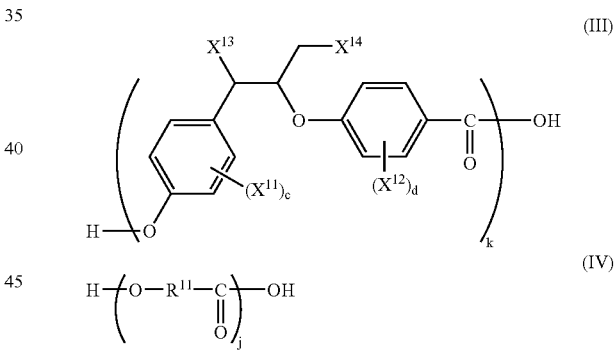

wherein $X^{11}$ and $X^{12}$ each independently represent a hydrogen atom, a hydroxyl group, a substituted or unsubstituted alkyl group, a substituted or unsubstituted aryl group, or a substituted or unsubstituted alkoxy group; $X^{13}$ and $X^{14}$ each independently represent a hydroxyl group, a substituted or unsubstituted alkyl group, a substituted or unsubstituted aryl group, a substituted or unsubstituted alkoxy group, or a substituted or unsubstituted alkoxycarbonyl group; c and d each independently are an integer of from 1 to 4; and k is an integer of from 1 to 10, and wherein $R^{11}$ represents a linear or branched alkylene group; and j is an integer of 10 or more.

As alkyl groups, those having 1 to 20 carbon atoms are preferable, those having 1 to 10 carbon atoms are more preferable, and those having 1 to 5 carbon atoms are still more preferable. As aryl groups, those having 1 to 20 carbon atoms are preferable, those having 1 to 10 carbon atoms are more preferable, and those having 1 to 5 carbon atoms are still more preferable. As alkoxy groups, those having 1 to 20 carbon atoms are preferable, those having 1 to 10 carbon atoms are more preferable, and those having 1 to 5 carbon atoms are still more preferable. As alkoxycarbonyl groups, those having 1 to 20 carbon atoms are preferable, and those having 1 to 10 carbon atoms are more preferable. As alkylene groups, those having 1 to 20 carbon atoms are preferable, those having 1 to 10 carbon atoms are more preferable, and those having 1 to 5 carbon atoms are still more preferable.

Specific examples of the lignophenol compound represented by formula (III) include compounds represented by formulae (K-1) to (K-14).

| Number | Structural Formula |
|---|---|
| K-1 | 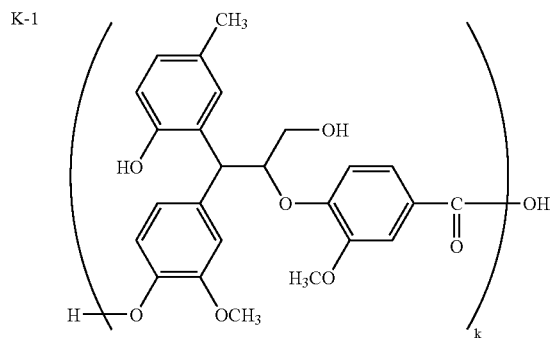 |
| K-2 | 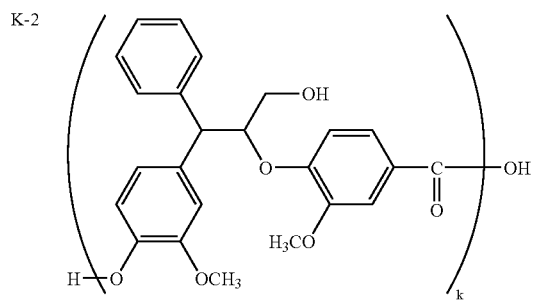 |
| K-3 | 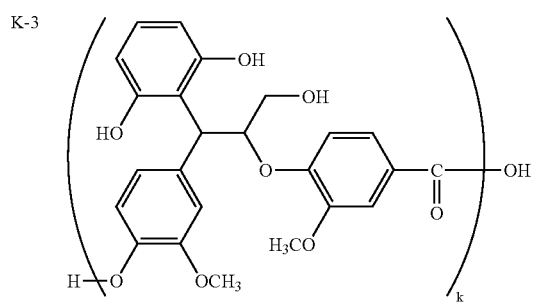 |

-continued

| Number | Structural Formula |
|---|---|
| K-4 | 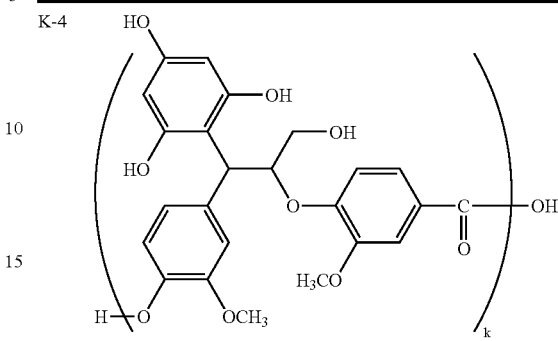 |
| K-5 | 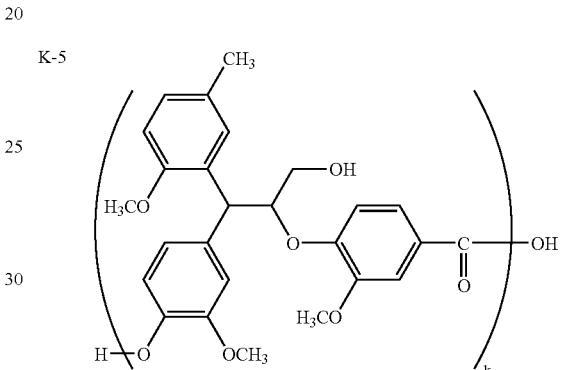 |
| K-6 | 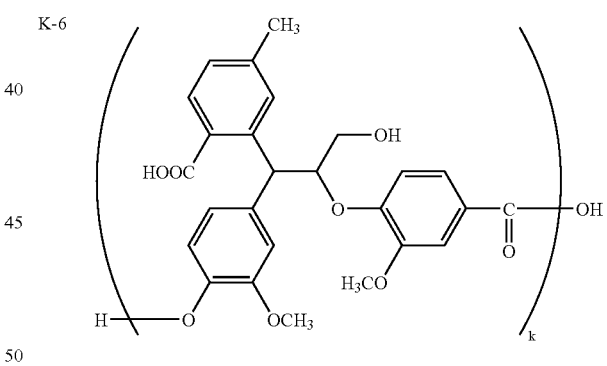 |
| K-7 | 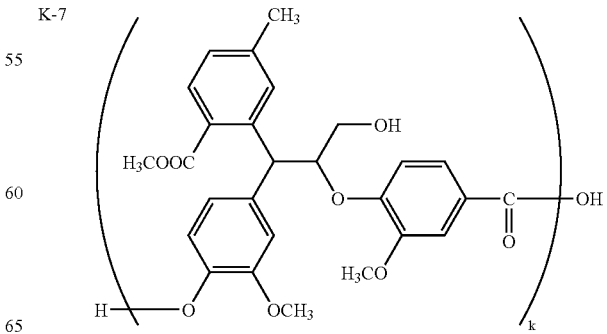 |

| Number | Structural Formula |
|---|---|
| K-8 | 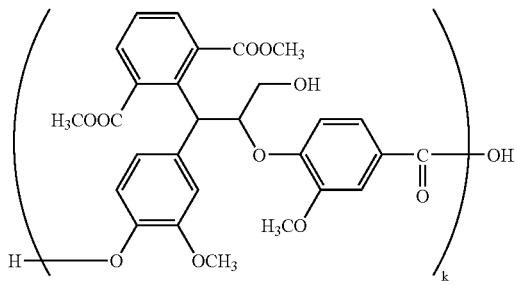 |
| K-9 | 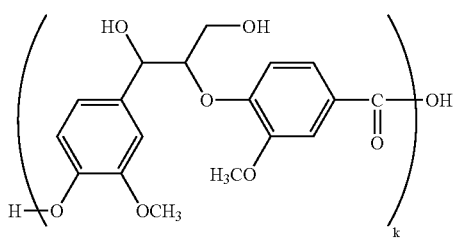 |
| K-10 | 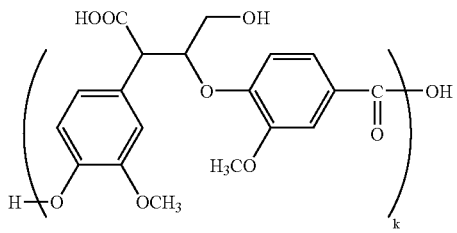 |
| K-11 | 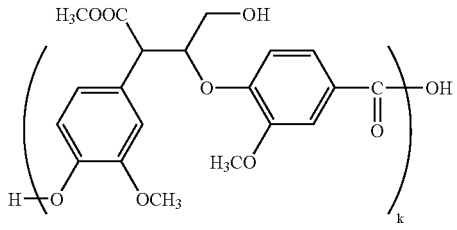 |
| K-12 | 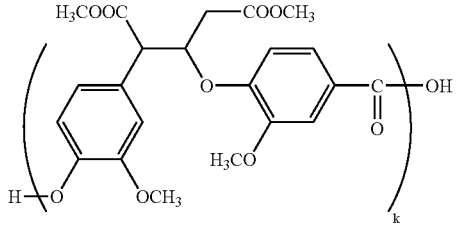 |
| K-13 | 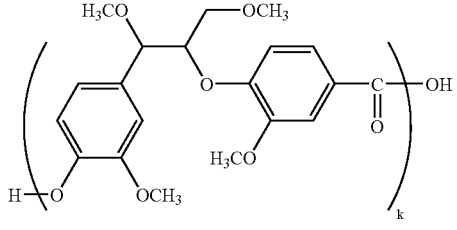 |

| Number | Structural Formula |
|---|---|
| K-14 | 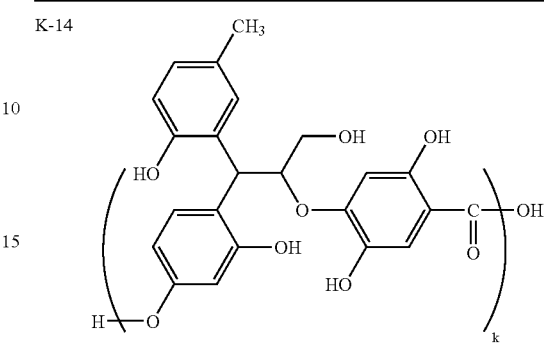 |

The lignophenol compounds represented by the above structural formulae (K-1) to (K-14) can use the commercially available products or compounds synthesized by the conventional method.

Specific examples of the aliphatic polyester compound represented by formula (IV) include compounds represented by formulae (J-1) to (J-10).

| Number | Structural Formula |
|---|---|
| J-1 | 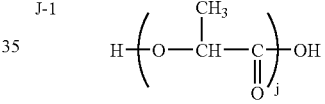 |
| J-2 | 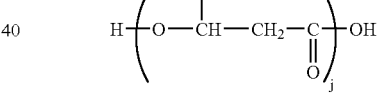 |
| J-3 | 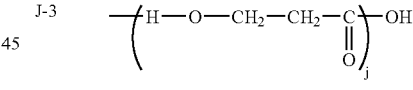 |
| J-4 | 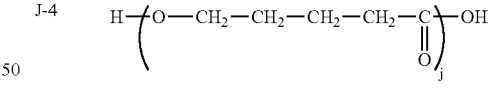 |
| J-5 | 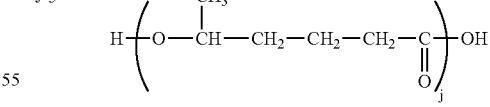 |
| J-6 | 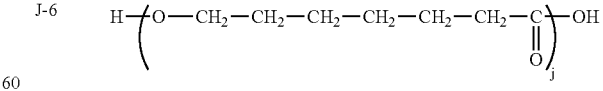 |
| J-7 | 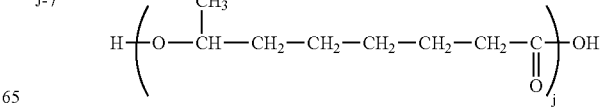 |

-continued

| Number | Structural Formula |
|---|---|
| J-8 | 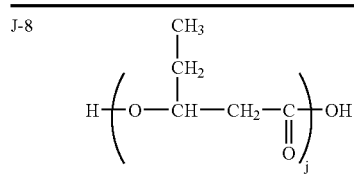 |
| J-9 | 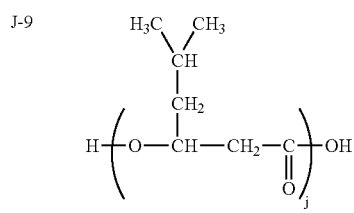 |
| J-10 | 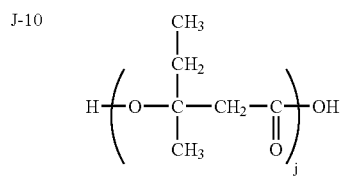 |

The aliphatic polyester compounds represented by the above structural formulae (J-1) to (J-10) can use the commercially available products or compounds synthesized by the method in the background art.

The reaction of the lignophenol compound represented by formula (III) with the aliphatic polyester compound represented by formula (IV) can proceed by, for example, heating to a temperature of from 100 to 200° C. in the presence of a catalyst compound such as tetrabutoxytitanium. The reaction can be conducted by maintaining a degree of vacuum or a pressure of from 0.0001 to 10 Pa, and stirring for from 2 to 10 hours. The copolymer according to this embodiment can be obtained by dissolving the reaction product obtained in a solvent such as tetrahydrofuran, and adding dropwise the resulting solution to a poor solvent such as methanol. Further, according to the similar manner as above, the copolymer contained in the first resin composition of this embodiment can also be synthesized.

The copolymer contained in the second resin composition can be obtained by reacting the lignophenol compound wherein k in formula (III) may be from 1 to 5 with the aliphatic polyester compound from the standpoint of improving low temperature fluidity. Further, the copolymer can be obtained by reacting the aliphatic polyester compound wherein j in formula (IV) may be from 10 to 100,000 with the lignophenol compound, and may be preferably obtained by reacting the aliphatic polyester compound wherein j in formula (IV) may be from 10 to 10,000 with the lignophenol compound, from the standpoint of improving low temperature fluidity.

The second resin composition may contain a copolymer obtained by reacting the aliphatic polyester compound with the lignophenol compound, in which k in formula (III) and j in formula (IV) are satisfied with formula (B):

$$10{,}000 \geq (j/k) \geq 10 \qquad (B)$$

Where the (j/k) is less than 10, low temperature moldability of the resin composition may be difficult to develop. On the other hand, where the (j/k) exceeds 10,000, low temperature moldability of the resin composition may be also difficult to develop. When the resin composition contains the copolymer satisfying the above formula (B), it is possible to produce the resin molding having excellent impact strength and heat resistance further surely. Further, the recycling efficiency of the resin molding can further be improved.

The copolymer contained in the second resin composition may be obtained by reacting the lignophenol compound having a weight average molecular weight within a range of from 500 to 100,000 represented by formula (III) with the aliphatic polyester compound having a weight average molecular weight within a range of from 2,000 to 1,000,000 represented by formula (IV). Where the lignophenol compound and the aliphatic polyester compound are a polymer having a high molecular weight, value in terms of polystyrene can be employed as the weight average molecular weight.

The copolymer contained in the second resin composition may be obtained by reacting the lignophenol compound with the aliphatic polyester compound, satisfying formula (C):

$$0.25 \geq (M_k/M_j) \geq 0.0001 \qquad (C)$$

wherein $M_k$ is a weight average molecular weight of the lignophenol compound represented by formula (III), and $M_j$ is a weight average molecular weight of the aliphatic polyester compound represented by formula (IV).

Further, the copolymer contained in the second resin composition may be obtained by using a polylactic acid represented by the above (J-1) as the aliphatic polyester compound represented by formula (IV). In this case, better low temperature fluidity can be obtained.

The copolymer may have a weight average molecular weight of from 10,000 to 500,000, and preferably from 20,000 to 200,000 in terms of polystyrene. Where the weight average molecular weight is less than 10,000, the resin molding product formed may have the tendency that impact strength becomes too low. On the other hand, where the weight average molecular weight exceeds 500,000, fluidity of the resin composition may decrease, and as a result, there may be the tendency that it is difficult to produce a resin molding product having a complicated shape by room temperature molding.

The copolymer can be used alone or as mixtures of two or more thereof.

In the second resin composition, the content of the copolymer may be 50 weight % or more, and preferably 70 weight % or more, based on the entire weight of the resin composition. Where the content of the copolymer is less than 50 weight %, low temperature moldability of the resin composition may be difficult to develop.

Where the first and second resin compositions are particularly used as a material of a resin molding product constituting home electrical appliances and business equipments, the resin molding product is required to have extremely high flame retardancy. The level of flame retardancy required varies depending on the products, but the flame retardancy corresponding to about V-2 or more in UL94 standard is frequently required. The first and second resin composition can achieve flame retardancy in a high level by adding a flame retardant.

A bromine flame retardant is generally said to have the highest effect as a flame retardant. However, the bromine flame retardant has the possibility to generate toxic gas when it is fired, and therefore it is better from the standpoint of environmental load that the bromine flame retardant is not used. On the other hand, phosphor, silicone and inorganic particle flame retardants have small environmental load and may be used. However, such flame retardants in the background art may have poor compatibility with polymer materials, bleeding occurs, mechanical strength deteriorates, and in particular, the phosphor flame retardant may have high hydrolyzability. Therefore, it has been extremely difficult to achieve both of flame retardancy and mechanical strength in the resin composition comprising an aliphatic polyester such as a polylactic acid, and the resin molding product using the resin composition.

Contrary to this, the resin composition according to the embodiment can obtain the resin molding product that achieves flame retardancy in a high level while sufficiently having biobased content, impact strength and heat resistance by further containing a flame retardant.

Examples of the flame retardant suitably used in the resin composition include phosphor flame retardants such as melamine polyphosphate, condensed phosphoric acid ester and ammonium polyphosphate; silicone flame retardants; and metal hydroxides.

In the resin composition, the content of the flame retardant may be from 1 to 50 weight %, and preferably from 2 to 30 weight %, based on the entire weight of the resin composition. Where the content of the flame retardant is less than 1 weight %, there may the tendency that flame retardancy is difficult to obtain, and on the other hand, the content of the flame retardant exceeds 50 weight %, there may be the tendency that mechanical strength of the molding deteriorates.

The resin composition may further contain other additives in addition to the above-described each component. Examples of the additives include compatibilizers, reinforcements, antioxidants, weathering agents, and hydrolysis inhibitors. The content of those additives is not particularly limited so long as it is in a range that does not impair the effect of the present invention, but may be 10 weight % or less for each additive, based on the entire weight of the resin composition.

<Resin Molding Product>

The resin molding product of the present invention is described below.

According to the resin molding product, because the above copolymer is contained, all of biobased content, impact strength and heat resistance can be achieved in a high level.

The resin molding product is obtained by molding the first or second resin composition described above, and, for example, is obtained by molding the resin composition by the method in the background art such as injection molding, injection compression molding, press molding, extrusion molding, blow molding, calender molding, coating molding, cast molding or dipping molding.

Applications of the resin molding product are not particularly limited, and specific examples of the application include packages of home electrical appliances and business equipments, or their various parts, wrapping films, cubby boxes for CD-ROM and DVD, tableware, trays for foods, bottles for drinks and wrapping materials for medicines.

Further, the resin molding product is molded using the resin composition described above, and therefore, can be produced by low temperature molding described hereinafter. Such a resin molding product can sufficiently increase the biobased content, and further can achieve extremely excellent impact strength and heat resistance. Further, according to the resin molding product, its ground material can be subjected to low temperature molding, and therefore, deterioration of the resin by heating when again molding (for example, lowering of a molecular weight by hydrolysis) can sufficiently be suppressed. This enables recycling efficiency of the molding to improve. In the background art, a resin molding product having high biobased content had low mechanical strength and extremely low flame retardancy, and therefore could not be used in home electrical appliances and business equipments. Thus, its application was extremely limited. Further, where a resin molding product is recycled, it is necessary to fluidize the resin at high temperature and then mold the same. This brought great decrease of impact strength and heat resistance. Contrary to this, the resin molding product according to the embodiment can obtain sufficient mechanical strength and sufficient flame retardancy even in the case of increasing the biobased content, and further, can sufficiently suppress deterioration of impact strength and heat resistance even where it is recycled. Therefore, the resin molding product can suitably be used in a part or a whole of packages of home electrical appliances and business equipments, or in various parts of home electrical appliances and business equipments. In particular, packages and various parts of business equipments have high usage rate of recycled material, and therefore, the resin composition of this embodiment is a material suitably used.

<Production Method of Resin Molding Product>

An exemplary production method of the resin molding product is described below.

According to the method of producing a resin molding product, by using the resin composition according to the embodiment, injection molding or extrusion molding can well be conducted while sufficiently suppressing deterioration of the resin when molding. Consequently, a resin molding product having high biobased content and further having extremely high impact strength and heat resistance can be produced.

The production method of the resin molding includes a step of subjecting the resin composition of the embodiment to low temperature molding. The term "low temperature" used in this embodiment means a temperature of 40° C. or lower.

The low temperature molding can be conducted by injection molding or extrusion molding. When the resin composition is melt molded by an injection molding method, the method may be conducted under the conditions that pressure in a cylinder is $10^{-3}$ Pa or higher, and preferably in a range of from $10^{-3}$ to $10^{-1}$ Pa, a mold temperature may be from 10 to 100° C., a cylinder temperature (maximum temperature) may be from 0 to 40° C., an injection time is from 10 to 200 seconds, and a cooling time is from 5 to 30 seconds. More preferably, the mold temperature may be from 15 to 30° C., the cylinder temperature (maximum temperature) may be from 5 to 30° C., the injection time may be from 15 to 35 seconds, and the cooling time may be from 10 to 20 seconds. The mold temperature and the cylinder temperature are temperatures actually measured using a surface thermometer and a thermocouple, respectively. The injection molding machine used is preferably a pressurized injection molding machine.

When the resin composition is molded by an extrusion molding method, the method may be conducted under conditions that pressure in a cylinder is $10^{-3}$ Pa or higher, and preferably in a range of from $10^{-3}$ to $10^{-1}$ Pa, and a cylinder temperature (maximum temperature) is from 0 to 40° C., and more preferably from 15 to 30° C. The cylinder temperature is temperature actually measured using a surface thermometer and a thermocouple.

The production method of the resin molding product can sufficiently increase the biobased content, and further can produce a resin molding product having extremely excellent impact strength and heat resistance.

In the production method of the resin molding product, when the resin composition contains the above-described copolymer and a flame retardant, it is possible to use a method of placing the copolymer and the flame retardant in an injection molding machine, and continuously kneading the mixture and molding the same to form a resin molding product. That is, from the standpoints of power consumption and production efficiency, it is possible to directly mold without kneading materials of a resin composition and then palletizing the resulting mixture.

The production method of the resin molding product can be utilized as a recycling method of a resin molding product. That is, the recycling method of the resin molding product comprises grinding the resin composition, and directly subjecting the ground resin molding product to low temperature molding. The low temperature molding may be conducted by injection molding or extrusion molding described above.

FIG. 1 is a perspective view of an image forming apparatus provided with packages and business equipment parts, according to an exemplary embodiment of the resin molding product, viewed from the front side thereof. The image forming apparatus 100 of FIG. 1 is provided with front covers 120a and 120b in front of a main body 110. Those front covers 120a and 120b are openable and closable such that a user can access in the apparatus. By this, the user can replenish a toner when the toner is consumed, can exchange a consumed process cartridge, and can remove clogged papers when jamming occurs in the apparatus. FIG. 1 shows the apparatus in the state that the front covers 120a and 120b are opened.

An operation panel 130 by which various conditions relating to image formation, such as a paper size and the number of copies, are input by the user, and a copy glass 132 on which an original copy to be read off is placed are provided on the upper surface of the main body 110. Further, the main body 110 is provided with, on the upper portion thereof, an automatic original copy carrier device that can automatically carry the original copy on the copy glass 134. Further, the main body 110 is provided with an image scanning device that obtains image data showing an image on the original copy by scanning the image on the original copy placed on the copy glass 132. The image data obtained by the image scanning device are sent to an image forming unit through a control part. The image scanning device and the control part are housed in the package 150 constituting a part of the main body 110. The image forming unit is provided in the package 150 as a detachable and attachable process cartridge 142. The process cartridge 142 can be detached and attached by turning an operation lever 144.

The package 150 of the main body 110 is provided with a toner storage part 146, and a toner can be replenished from a toner supply port 148. The toner stored in the toner storage part 146 is supplied to a development device.

On the other hand, the main body 110 is provided with paper storage cassette 140a, 140b and 140c on the bottom part thereof. Further, plural delivery rollers constituted of a pair of rollers are arranged in the main body 110, so that a delivery passage is formed such that papers in the paper storage cassette is delivered to the image forming unit located at the upper part. Paper in each paper storage cassette is taken out every one paper by a paper takeoff mechanism arranged in the vicinity of the edge of the delivery passage, and is sent to the delivery passage. A manual paper tray 136 is provided at the side of the main body 110, and the paper can be supplied from this.

The paper having an image formed thereon by the image forming unit is successively transferred between two fixing rolls mutually contacted, supported by the package 152 constituting a part of the main body 110, and then discharged to the outside of the main body 110. The main body 110 is provided with a plurality of discharge trays 138 at the side opposite the side at which the paper tray 136 is provided, and papers after image formation are discharged to those trays.

The resin molding product has sufficiently high impact strength, heat resistance and flame retardancy, and is therefore suitable as an exterior package (housing) of the above-described electrophotographic device, parts constituting a package (front cover, rear cover and the like) and a paper feeding tray. Further, the resin molding product has excellent recycling efficiency, and is therefore particularly suitable as a front cover, a toner cartridge and the like.

EXAMPLES

The present invention is described in more detail by the Examples, but it should be understood that the invention is not construed as being limited thereto.

<Preparation of Resin Molding Product>

Example 1

1 part by weight of a compound (1-1) represented by formula (1-1), and 100 parts by weight of the compound (2-1) represented by formula (2-1) (obtained by synthesizing such that the degree of polymerization is 20 on the average, and then batching off the compound corresponding to the degree of polymerization of 20 with a liquid chromatographic mass spectrometry) were placed in a 1 liter three-necked flask, and 0.005 part by weight of tetrabutoxytitanium was added thereto, followed by heating to 180° C. Pressure in the system was reduced up to $10^{-3}$ Pa over 2 hours while stirring. Temperature of 180° C. and degree of vacuum of $10^{-3}$ Pa were maintained, and the mixture in the flask was stirred for 12 hours to conduct reaction. 10 parts by weight of the reaction product thus obtained was dissolved in 100 parts by weight of tetrahydrofuran, and the resulting solution was added dropwise to 2,000 parts by weight of methanol to form precipitate. The precipitate thus formed was filtered off by filtration, and dried at 80° C. for 4 hours to obtain a copolymer (yield 90%). The copolymer had a weight average molecular weight of 69,000 in terms of a standard polystyrene conversion.

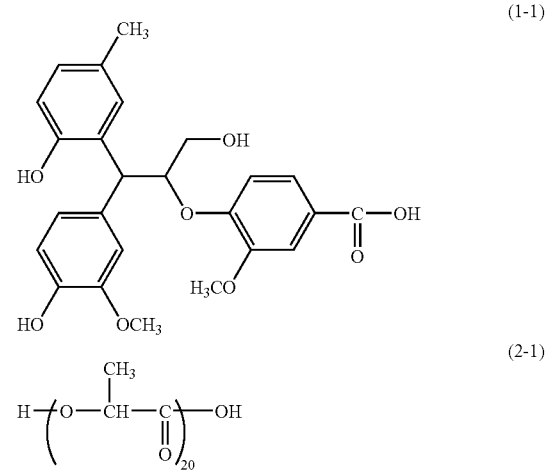

The copolymer obtained above was introduced into an injection molding machine (NEX-50, a product of Nissei Plastic Industrial Co., Ltd.) modified so as to be pressurizable, pressurized to $10^{-2}$ Pa with nitrogen gas, and injection molded under the conditions that cylinder temperature and mold temperature each are set to 25° C., thereby obtaining two kinds of resin molding products of an ISO versatile dumbbell test piece (gap 120 mm×10 mm×40 mm) and a test piece for deflection temperature under load (1,200 mm×10 mm×40 mm).

Example 2

A copolymer is obtained in the same manner as in Example 1 except that 50 parts by weight of a compound (2-2) represented by the following general formula (2-2) (obtained by synthesizing such that the degree of polymerization is 10 on the average, and then batching off the compound corresponding to the degree of polymerization of 10 with a liquid chromatographic weight spectrometry) were used in pace of 100 parts by weight of the compound (2-1) (yield 91%). The copolymer had a weight average molecular weight of 85,000 in terms of a standard polystyrene conversion.

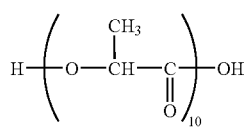

(2-2)

The copolymer obtained above was injection molded in the same manner as in Example 1 to obtain resin molding products of Example 2 (an ISO versatile dumbbell test piece and a test piece for deflection temperature under load).

Example 3

A copolymer is obtained in the same manner as in Example 1 except that 50,000 parts by weight of a compound (2-3) represented by the following general formula (2-3) (obtained by synthesizing such that the degree of polymerization is 10,000 on the average, and then batching off the compound corresponding to the degree of polymerization of 10,000 with a liquid chromatographic weight spectrometry) were used in pace of 100 parts by weight of the compound (2-1) (yield 89%). The copolymer had a weight average molecular weight of 59,000 in terms of a standard polystyrene conversion.

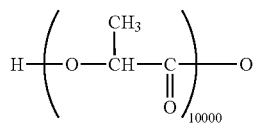

(2-3)

The copolymer obtained above was injection molded in the same manner as in Example 1 to obtain resin molding products of Example 3 (an ISO versatile dumbbell test piece and a test piece for deflection temperature under load).

Example 4

A copolymer is obtained in the same manner as in Example 1 except that 1 part by weight of a compound (1-2) represented by the following general formula (1-2) was used in pace of 1 part by weight of the compound (1-1) (yield 95%). The copolymer had a weight average molecular weight of 35,000 in terms of a standard polystyrene conversion.

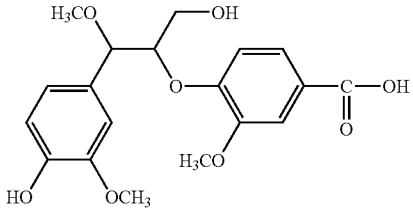

(1-2)

The copolymer obtained above was injection molded in the same manner as in Example 1 to obtain resin molding products of Example 4 (an ISO versatile dumbbell test piece and a test piece for deflection temperature under load).

Example 5

A copolymer is obtained in the same manner as in Example 1 except that 1 part by weight of a compound (1-3) represented by the following general formula (1-3) was used in pace of 1 part by weight of the compound (1-1) (yield 89%). The copolymer had a weight average molecular weight of 38,000 in terms of a standard polystyrene conversion.

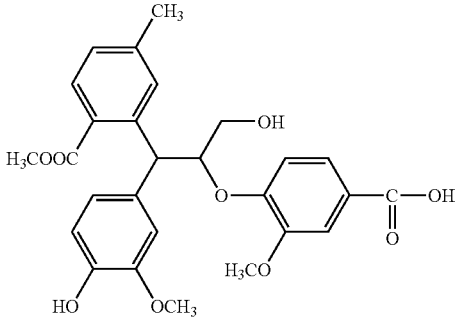

(1-3)

The copolymer obtained above was injection molded in the same manner as in Example 1 to obtain resin molding products of Example 5 (an ISO versatile dumbbell test piece and a test piece for deflection-temperature under load).

Example 6

A copolymer is obtained in the same manner as in Example 1 except that 100 parts by weight of a compound (2-4) represented by the following general formula (2-4) (obtained by synthesizing such that the degree of polymerization is 20 on the average, and then batching off the compound corresponding to the degree of polymerization of 20 with a liquid chromatographic mass spectrometry) were used in pace of 100 parts by weight of the compound (2-1) (yield 92%). The copolymer had a weight average molecular weight of 29,000 in terms of a standard polystyrene conversion.

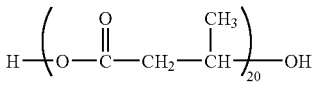

(2-4)

The copolymer obtained above was injection molded in the same manner as in Example 1 to obtain resin molding products of Example 6 (an ISO versatile dumbbell test piece and a test piece for deflection temperature under load).

Comparative Example 1

A polylactic acid (trade name "Lacea H-100", a product of Mitsui Chemicals, Inc.) was introduced into an injection molding machine (NEX-50, a product of Nissei Plastic Industrial Co., Ltd.), and injection molded under the conditions that cylinder temperature is 180° C. and mold temperature is 30° C., thereby obtaining the same two kinds of resin molding products (an ISO versatile dumbbell test piece and a test piece for deflection temperature under load) as in Example 1.

Comparative Example 2

A polylactic acid/polycarbonate alloy resin (trade name "V554R10", a product of Toray Industries, Inc.) was introduced into an injection molding machine (NEX-50, a product of Nissei Plastic Industrial Co., Ltd.), and injection molded under the conditions that cylinder temperature is 220° C. and mold temperature is 40° C., thereby obtaining the same two kinds of resin molding products (an ISO versatile dumbbell test piece and a test piece for deflection temperature under load) as in Example 1.

Regarding the resin molding products obtained in Examples 1 to 6 and Comparative Examples 1 to 2, Charpy impact strength, deflection temperature under load and maintenance factor of Charpy impact strength were measured according to the following methods. The results obtained are shown in Table 7.

(Charpy Impact Strength)

Using notched ISO versatile Dumbbell test piece, Charpy impact strength ($kJ/m^2$) was measured with a digital impact strength measurement device (DB-C, a product of Toyo Seiki Co., Ltd.) according to the method as specified in ISO-179.

(Deflection Temperature Under Load)

Using a test piece for deflection temperature under load, deflection temperature under load (° C.) was measured under a load of 0.45 MPa with HDT measurement device (standard model, a product of Toyo Seiki Co., Ltd.) according to the method as specified in ISO-360.

(Maintenance Factor of Charpy Impact Strength)

A step of grinding the ISO versatile dumbbell test piece obtained and a step of obtaining a fresh test piece by injection molding the ground material under the same molding conditions that the test piece was molded were repeated five times. Using a notched ISO versatile dumbbell test piece obtained in the fifth operation, Charpy impact strength ($kJ/m^2$) was measured with a digital impact strength measurement device (DB-C, a product of Toyo Seiki Co., Ltd.) according to the method as specified in ISO-179. Maintenance factor of Charpy impact strength (%) defined by the following equation was obtained as the recycling efficiency of a resin molding product.

Maintenance factor of Charpy impact strength (%)=
(Charpy impact strength ($kJ/m^2$) of ISO versatile dumbbell test piece obtained in fifth operation)/
(Charpy impact strength ($kJ/m^2$) of ISO versatile dumbbell test piece obtained first)×100

TABLE 1

| | Molding temperature (° C.) | Charpy impact strength ($kJ/m^2$) | Deflection temperature under load (° C.) | Maintenance factor of Charpy impact strength (%) |
|---|---|---|---|---|
| Example 1 | 25 | 3.6 | 95 | 100 |
| Example 2 | 25 | 3.8 | 95 | 100 |
| Example 3 | 25 | 3.3 | 92 | 100 |
| Example 4 | 25 | 3.4 | 94 | 100 |
| Example 5 | 25 | 3.6 | 94 | 100 |
| Example 6 | 25 | 3.9 | 92 | 100 |
| Comparative Example 1 | 180 | 0.5 | 58 | 85 |
| Comparative Example 2 | 220 | 2.7 | 87 | 79 |

As shown in Table 1, it was confirmed that even though the resin molding products of Examples 1 to 6 according to the present invention contain the biomass in an amount of 98 weight % or more, the impact strength and heat resistance are sufficiently excellent as compared with the resin molding products of Comparative Examples 1 and 2 produced from the conventional blend resin material. Further, it was confirmed that the resin molding products of Examples 1 to 6 maintain sufficient impact strength even though repeatedly molded, and are excellent even in the recycling efficiency.

<Preparation of Front Cover>

Example 7

10 parts by weight of a copolymer obtained in the same manner as in Example 1, and 3 parts by weight of melamine polyphosphate (trade name "MPP-B", a product of Sanwa Chemical Co., Ltd.) were introduced into an injection molding machine (NEX-50, a product of Nissei Plastic Industrial Co., Ltd.) modified so as to be pressurizable, and injection molded under the same pressure, cylinder temperature and mold temperature as in Example 1 to form a front cover of a color copying machine (DocuCentre Color 500, a product of Fuji Xerox Co., Ltd.).

Examples 8 to 12

Front covers of Examples 8 to 12 were prepared in the same manner as in Example 7 except for using the copolymers obtained in the same manner as in Examples 2 to 6, respectively, in place of the copolymer used in Example 7.

A polylactic acid (trade name "Lacea H-100", a product of Mitsui Chemicals, Inc.) was introduced into an injection molding machine (NEX-50, a product of Nissei Plastic Industrial Co., Ltd.), and injection molded under the conditions that cylinder temperature is 180° C. and mold temperature is 30° C., thereby obtaining a front cover having the same shape as in Example 7.

Comparative Example 4

A polylactic acid/polycarbonate alloy resin (trade name "V554R10", a product of Toray Industries, Inc.) was introduced into an injection molding machine (NEX-50, a product of Nissei Plastic Industrial Co., Ltd.), and injection molded under the conditions that cylinder temperature is 220° C. and mold temperature is 40° C., thereby obtaining a front cover having the same shape as in Example 7.

Regarding the front covers obtained in Examples 7 to 12 and Comparative Examples 3 and 4, face impact strength, flame retardancy and maintenance factor of face impact strength were measured according to the following methods. The results obtained are shown in Table 8.

(Face Impact Strength)

Using a front cover, face impact strength (J) was measured under the condition of a cylinder speed of 1,000 mm/min with a sheet impact tester (H-100, a product of Toyo Seiki Co., Ltd.).

(Flame Retardancy)

UL test piece (thickness 2 mm) was cut of from a front cover. Using this UL test piece, UL94-V combustion test was conducted by a vertical combustion test according to JIS Z2391.

(Maintenance Factor of Face Impact Strength)

A step of grinding a front cover obtained and a step of obtaining a fresh front cover by injection molding the ground material under the same conditions that the front cover was molded were repeated five times. Using the front cover obtained in the fifth operation, face impact strength (J) was measured under the condition of cylinder speed of 1,000 mm/min with a sheet impact tester (H-100, a product of Toyo Seiki Co., Ltd.). Maintenance factor of face impact strength (%) defined by the following equation was obtained as the recycling efficiency of a front cover.

Maintenance factor of face impact strength (%)=
(Maintenance factor of face impact strength (J) of front cover obtained in fifth operation)/(Maintenance factor of face impact strength (J) of front cover obtained first)×100

TABLE 2

| | Molding temperature (° C.) | Face impact strength (J) | Flame retardancy | Maintenance factor of face impact strength (%) |
|---|---|---|---|---|
| Example 7 | 25 | 28 | 5VB | 100 |
| Example 8 | 25 | 26 | 5VB | 100 |
| Example 9 | 25 | 35 | 5VB | 100 |
| Example 10 | 25 | 26 | 5VB | 100 |
| Example 11 | 25 | 28 | 5VB | 100 |
| Example 12 | 25 | 29 | 5VB | 100 |
| Comparative Example 3 | 180 | 0.6 | Not | 18 |
| Comparative Example 4 | 220 | 18 | V-0 | 45 |

As shown in Table 2, it was confirmed that business equipment parts (front cover) of Examples 7 to 12 according to the present invention have high face impact strength than the business equipment parts of Comparative Examples 3 and 4 produced from the conventional blend resin material, and further have excellent flame retardancy. Therefore, it was seen that according to the resin composition of the present invention, it is possible to achieve both flame retardancy and mechanical strength in a resin molding product. Further, business equipment parts (front cover) of Examples 7 to 12 maintain sufficient face impact strength even though molded repeatedly, and it was therefore confirmed that the recycling efficiency are also excellent.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising a copolymer having a structure represented by formula (I) and a structure represented by formula (II):

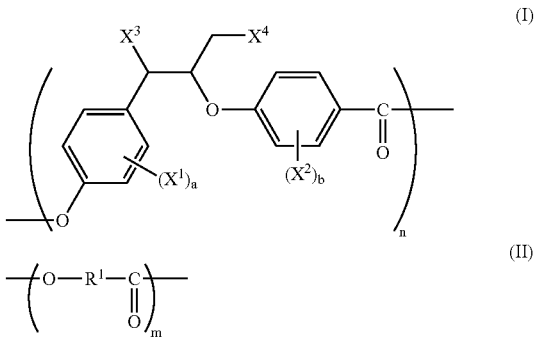

wherein $X^1$ and $X^2$ each independently represent a hydrogen atom, a hydroxyl group, a substituted or unsubstituted alkyl group, a substituted or unsubstituted aryl group, or a substituted or unsubstituted alkoxy group; $X^3$ and $X^4$ each independently represent a hydroxyl group, a substituted or unsubstituted alkyl group, a substituted or unsubstituted aryl group, a substituted or unsubstituted alkoxy group, or a substituted or unsubstituted alkoxycarbonyl group; a and b each independently are an integer of from 1 to 4, and n is an integer of from 1 to 10, and wherein $R^1$ represents a linear or branched alkylene group; and m is an integer of 10 or more.

2. The resin composition according to claim 1, wherein the copolymer satisfies formula (A): $10,000 \geqq (m/n) \geqq 10$.

3. The resin composition according to claim 1, wherein the copolymer has a weight average molecular weight of from 10,000 to 500,000 in terms of polystyrene.

4. The resin composition according to claim 1, wherein a content of the copolymer is 50 weight % or more based on the entire weight of the resin composition.

5. The resin composition according to claim 1, further comprising a flame retardant.

6. A resin composition comprising a copolymer obtained by reacting a lignophenol compound represented by the formula (III) with an aliphatic polyester compound represented by formula (IV):

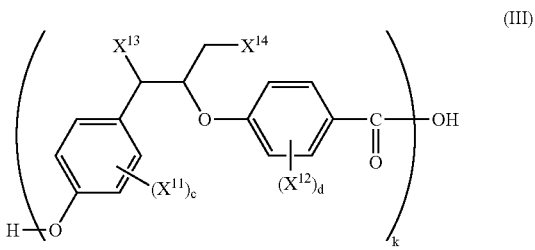

-continued

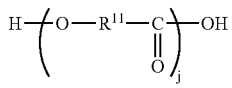

(IV)

wherein $X^{11}$ and $X^{12}$ each independently represent a hydrogen atom, a hydroxyl group, a substituted or unsubstituted alkyl group, a substituted or unsubstituted aryl group, or a substituted or unsubstituted alkoxy group; $X^{13}$ and $X^{14}$ each independently represent a hydroxyl group, a substituted or unsubstituted alkyl group, a substituted or unsubstituted aryl group, a substituted or unsubstituted alkoxy group, or a substituted or unsubstituted alkoxycarbonyl group; c and d each independently are an integer of from 1 to 4; and k is an integer of from 1 to 10, and wherein $R^{11}$ represents a linear or branched alkylene group; and j is an integer of 10 or more.

7. The resin composition according to claim 6, wherein the lignophenol compound represented by the formula (III) and the aliphatic polyester compound represented by formula (IV) satisfy formula (B): $10,000 \geq (j/k) \geq 10$.

8. The resin composition according to claim 6, wherein the copolymer has a weight average molecular weight of from 10,000 to 500,000 in terms of polystyrene.

9. The resin composition according to claim 6, wherein a content of the copolymer is 50 weight % or more based on the entire weight of the resin composition.

10. The resin composition according to claim 6, further comprising a flame retardant.

11. A resin molding product comprising a copolymer having a structure represented by formula (I) and a structure represented by formula (II):

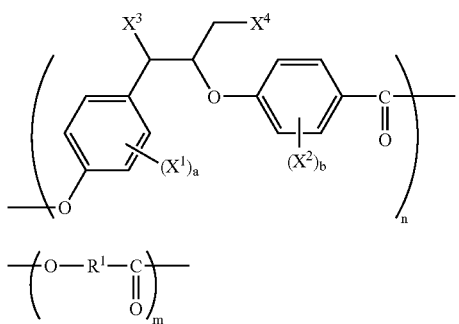

wherein $X^1$ and $X^2$ each independently represent a hydrogen atom, a hydroxyl group, a substituted or unsubstituted alkyl group, a substituted or unsubstituted aryl group, or a substituted or unsubstituted alkoxy group; $X^3$ and $X^4$ each independently represent a hydroxyl group, a substituted or unsubstituted alkyl group, a substituted or unsubstituted aryl group, a substituted or unsubstituted alkoxy group, or a substituted or unsubstituted alkoxycarbonyl group; a and b each independently are an integer of from 1 to 4, and n is an integer of from 1 to 10, and wherein $R^1$ represents a linear or branched alkylene group; and m is an integer of 10 or more.

12. The resin molding product according to claim 11, wherein the copolymer satisfies formula (A): $10,000 \geq (m/n) \geq 10$.

13. The resin molding product according to claim 11, wherein the copolymer has a weight average molecular weight of from 10,000 to 500,000 in terms of polystyrene.

14. The resin molding product according to claim 11, wherein a content of the copolymer is 50 weight % or more based on the entire weight of the resin composition.

15. The resin molding product according to claim 11, further comprising a flame retardant.

16. The resin molding product according to claim 11, partially or wholly comprising the copolymer.

17. The resin molding product according to claim 11, which is for a business equipment.

18. The resin molding product according to claim 11, which is for a package.

19. A resin molding product comprising a copolymer obtained by reacting a lignophenol compound represented by the formula (III) with an aliphatic polyester compound represented by formula (IV):

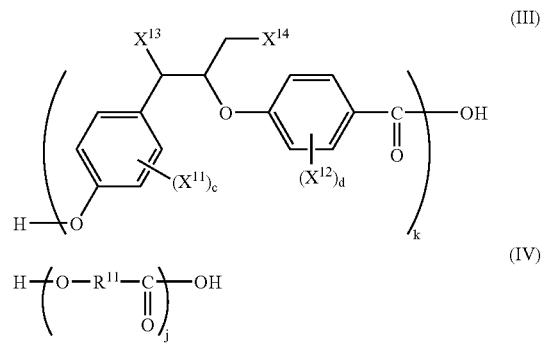

wherein $X^{11}$ and $X^{12}$ each independently represent a hydrogen atom, a hydroxyl group, a substituted or unsubstituted alkyl group, a substituted or unsubstituted aryl group, or a substituted or unsubstituted alkoxy group; $X^{13}$ and $X^{14}$ each independently represent a hydroxyl group, a substituted or unsubstituted alkyl group, a substituted or unsubstituted aryl group, a substituted or unsubstituted alkoxy group, or a substituted or unsubstituted alkoxycarbonyl group; c and d each independently are an integer of from 1 to 4; and k is an integer of from 1 to 10, and wherein $R^{11}$ represents a linear or branched alkylene group; and j is an integer of 10 or more.

20. The resin molding product according to claim 19, wherein the lignophenol compound represented by the formula (III) and the aliphatic polyester compound represented by formula (IV) satisfy formula (B): $10,000 \geq (j/k) \geq 10$.

21. The resin molding product according to claim 19, wherein the copolymer has a weight average molecular weight of from 10,000 to 500,000 in terms of polystyrene.

22. The resin molding product according to claim 19, wherein a content of the copolymer is 50 weight % or more based on the entire weight of the resin composition.

23. The resin molding product according to claim 19, further comprising a flame retardant.

24. The resin molding product according to claim 19, partially or wholly comprising the copolymer.

25. The resin molding product according to claim 19, which is for a business equipment.

26. The resin molding product according to claim 19, which is for a package.

27. A method of producing a resin molding product, comprising subjecting a resin composition according to claim 1 to injection molding or extrusion molding under a temperature of 40° C. or lower and a pressure of $10^{-3}$ Pa or higher.

28. A method of producing a resin molding product, comprising subjecting a resin composition according to claim 6 to injection molding or extrusion molding under a temperature of 40° C. or lower and a pressure of $10^{-3}$ Pa or higher.

29. A method of recycling a resin molding product, comprising:

grinding a resin molding product according to claim 11; and subjecting the resin molding product to injection molding or extrusion molding.

30. A method of recycling a resin molding product, comprising:

grinding a resin molding product according to claim 19; and subjecting the resin molding product to injection molding or extrusion molding.

* * * * *